Sept. 17, 1935.  W. B. HENDREY ET AL  2,014,936
DEHYDRATING OIL
Filed July 10, 1931
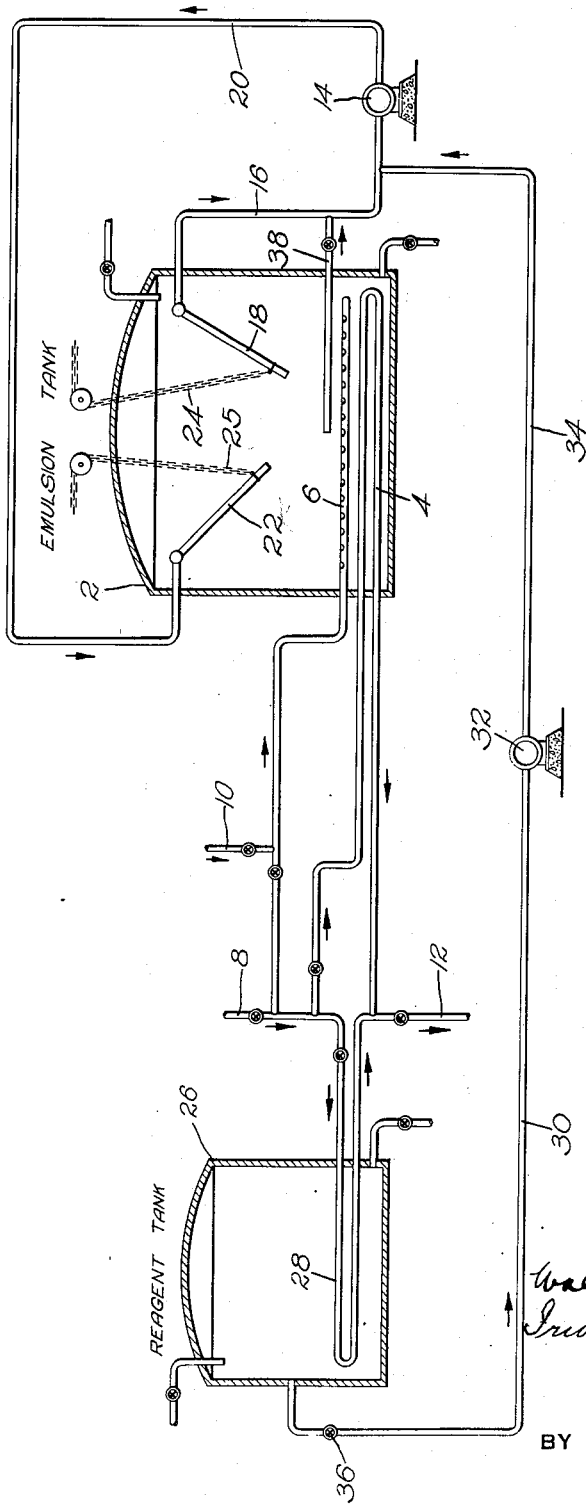

Patented Sept. 17, 1935

2,014,936

UNITED STATES PATENT OFFICE 2,014,936

DEHYDRATING OIL

Waldersee B. Hendrey, Port Arthur, Tex., and Irvin A. Ebaugh, New York, N. Y., assignors to The Texas Company, New York, N. Y., a corporation of Delaware Application July 10, 1931, Serial No. 549,934

5 Claims. (Cl. 196—4)

This invention relates to dehydrating oil and has to do particularly with the dehydration of mineral oil which contains water in the form of an emulsion.

The emulsions of oil and water suitable for treatment, according to the invention, may be any emulsions of petroleum oil, occurring in nature, or refinery practice. Emulsions of this type comprise emulsions or bottom settlings from various crude or partially refined oils, such as crude oil, fuel oil, gas oil, paraffin distillate and coke still distillate. In the breaking of emulsions of this type it has been customary to use various chemicals or spent treating agents, such as alkalies previously used in oil refinery operations.

Instead of depending on fresh or spent chemicals we employ a by-product resulting from the refining of petroleum oils. We have discovered that the still bottoms or residue remaining after the vacuum distillation of lubricating oils is a particularly efficient reagent, alone or in combination with an aqueous alkali, for breaking stable emulsions of various oils. The still bottoms resulting from the vacuum distillation of lubricating oil usually amount to about 2% to 5% of the original volume of the oil charged to the still. The bottoms are liquid at high temperatures but are often highly viscous or semi-solid at ordinary temperatures. The composition of the bottoms is not definitely known but is believed to consist largely of heavy oil and colloidal material containing varying quantities of the salts of complex organic acids and other saponifiable compounds. These acids are generally known as naphthenic acids. Sometimes alkali, such as caustic soda, is added to the contents of the still and in that event the residual material or bottoms will have a certain degree of alkalinity depending on the amont of alkali used.

It is preferable, especially when the amount of alkali in the still bottoms is small, to mix an aqueous alkali or caustic water therewith. The caustic water may consist of fresh caustic soda or spent alkali solution from previous refinery operations, such as spent doctor or spent caustic used in washing various distillate oils or refinery gases. The still bottoms are preferably added to the caustic solution and the materials commingled until there is formed an aqueous mixture which can be conveniently pumped. The amount of the treating materials in the reagent may vary for each particular sample of emulsion treated. In general, the amount of vacuum still bottoms equal to $\frac{1}{10}$ to 1% of the volume of the emulsion has been found sufficient in all cases. Likewise, whenever cuastic alkali is required, $\frac{1}{10}$% to 1½% by volume to 20° Baumé gravity caustic has been found to be sufficient. The quantity of the treating reagent is usually determined experimentally for each type of emulsion but even then it may vary somewhat due to the fluctuation in treating conditions and consequently the reagent is added in regulated quantity until stratification of the oil and aqueous constituents occurs.

In treating emulsions, according to the invention, we have devised a method of contacting a large volume of the emulsion with a relatively small volume of treating reagent. The method consists briefly of preparing hot batches of the treating reagents and the emulsion, withdrawing separate streams from the batches and uniting the streams in regulated proportions so that breaking of the emulsion takes place. The broken emulsion is then allowed to stratify and the water to separate. It is preferable that the mixture resulting from uniting the streams be passed back to the batch of emulsion which is kept at a temperature of about 180° F. to 200° F. and as stratification takes place the stream of emulsion is continuously drawn from a level in the batch above the separated aqueous layer. As the treatment proceeds, three layers usually appear, consisting of a top layer of oil, a middle layer of emulsion and a bottom layer of water. By continuously drawing a stream from the layer of emusion, for mixing with the treating reagent, eventually the entire batch of emulsion is separated. The invention may be more clearly understood by referring to the accompanying drawing which comprises an embodiment thereof.

Referring to the drawing, we provide a tank 2 for holding the emulsion to be treated. This tank is usually of large capacity, preferably upwards of 25,000 bbls. The tank is filled about three quarters full of emulsion in order to leave a vapor space for expansion and for general safety. The contents of the tank are then heated to around 180° F. to 200° F. by means of a steam coil 4. In some cases it may be desirable to use live steam and therefore we have provided an open steam pipe 6 through which steam or air may be admitted, if desired. The steam or air may be supplied through lines 8 and 10. The steam from the closed coil 4 is exhausted through the pipe 12. To agitate the materials within the tank 2 there is provided a large circular pump 14. This pump is adapted to circulate about 1,000 bbls. per hour, taking suction on the contents of tank 2 through the pipe 16, which in turn is connected to a swing line 18. The liquid from the pump 14 is discharged through the pipe 20 which communicates with a swing line 22. The swing lines 18 and 22 are equipped with chains 24 and 25 respectively so that the ends may be lowered or raised to suitable depths in the tank.

A batch of treating reagent is kept in a separate tank 25, usually of somewhat smaller capacity than tank 2 and which may likewise be heated by a steam coil 28. The treating reagents are preferably maintained at a temperature approximately the same as that of the emulsion to be treated. The hot reagent is drawn from the tank 26 through the line 30 by pump 32 and passed through a line 34 into the pipe 16 leading to the suction side of pump 14 which is circulating the emulsion. The quantity of reagent may be conveniently regulated by the pump 32 or by a valve 36 in the line 30.

In practicing the process of the invention, the tank 2 is charged with emulsion, say about 18,000 bbls., and heated to a temperature in the region of 180° F.–200° F. Rapid circulation is maintained by the pump 14 until a constant temperature of the contents of the tank is obtained. The hot treating reagent, which may comprise predetermined quantities of aqueous vacuum still bottoms and caustic soda, is then pumped into the suction line 16 of the circulating pump 14, by means of the small pump 32. This pump is operated at a rate to deliver just enough of the hot treating reagent from tank 26 to completely break the emulsion being circulated, as shown by samples taken at intervals from the discharge line 20. The broken emulsion may be allowed to separate while the temperature is maintained and for this purpose it is preferable that the mixture be returned or circulated back to the tank 2. The operation is continued until a substantial water layer builds up and when the suction line 18 begins to draw water the line is gradually lifted. The oil released accumulates in a layer at the top and the unbroken emulsion, which is intermediate the gravity of the oil and the water, stratifies between the oil and water layers. This stratified layer of emulsion becomes smaller as the oil and water are released. By keeping the swing line 18 a short distance above the water layer the heaviest and thickest emulsion layer will receive a treatment of concentrated chemicals in the pump 14. The procedure is continued until a thin layer of emulsion remains.

As soon as there remains but one foot or less of the broken emulsion the pump 32 is stopped and no more treating reagent added. Suction by the circulating pump 14 is continued on the swing line 18 showing a heavy thick unbroken emulsion. At this time the valve in the line 38 is opened and suction taken on the water layer near the bottom of the tank. In this manner the unbroken emulsion will be mixed with the hot treating reagent contained in the dilute aqueous layer at the bottom of the tank. Sufficient of this dilute reagent is blended with the emulsion to give a complete break of the emulsion while passing through pump 14. The operation is continued until the emulsion layer entirely disappears.

After the emulsion is completely broken, suction line 18 is dropped to the bottom of the tank and the hot aqueous layer circulated by pump 14 back to the top of the tank for a number of hours. In this manner the oil layer will be completely washed free of suspended solids and moisture. At the end of the washing operation the oil and water layers will be approximately the same temperature and the entire contents of the tank are in the neighborhood of 180° F. The entire contents of the tank are then allowed to settle without agitation. At the end of a period of time, ranging from one to four days, there accumulates a deep layer of clean dry oil, on the top, with a deep layer of water containing sediment on the bottom of the tank. The clean, dry oil may then be pumped to storage.

Obviously many modifications and variations of the invention, as hereinbefore set forth, may be made without departing from the spirit and scope thereof, and therefore only such limitations should be imposed as are indicated in the appended claims.

We claim:

1. The method of resolving petroleum emulsions of the water-in-oil type which comprises commingling with the emulsion alkaline still bottoms containing free alkali, undistilled heavy oil within the lubricating oil range and alkaline salts of naphthenic acids of high molecular weight, while maintaining the temperature sufficiently high to effect the resolution of the emulsion.

2. The method of resolving petroleum emulsions of the water-in-oil type which comprises maintaining the emulsion at about 180°–200° F. while commingling with the emulsion alkaline still bottoms from the distillation of lubricating oils, said bottoms containing free alkali, undistilled heavy lubricating oil and alkaline salts of naphthenic acids of high molecular weight.

3. The method of resolving petroleum emulsions of the water-in-oil type which comprises maintaining the emulsion at an elevated temperature while commingling with the emulsion about $\frac{1}{10}$ to 1% of still bottoms from the vacuum distillation of lubricating oils over caustic alkali, said bottoms containing free alkali, undistilled heavy lubricating oil and salts of naphthenc acids of high molecular weight.

4. The method of resolving petroleum emulsions of the water-in-oil type which comprises maintaining the emulsion at a temperature in the region of 180°–200° F. while commingling with the emulsion a small proportion of a reagent consisting essentially of aqueous alkali solution and still bottoms from the vacuum distillation of lubricating oils, said still bottoms containing a small amount of free alkali, undistilled heavy oil and salts of naphthenic acids of high molecular weight.

5. The method according to claim 4 in which the quantity of aqueous alkali solution used is equivalent to about $\frac{1}{10}$ to 1½% of a 20° Bé. aqueous caustic soda solution.

WALDERSEE B. HENDREY.
IRVIN A. EBAUGH.